US009148348B2

(12) United States Patent
Mudigonda et al.

(10) Patent No.: US 9,148,348 B2
(45) Date of Patent: Sep. 29, 2015

(54) GENERATING NETWORK TOPOLOGIES

(75) Inventors: Jayaram Mudigonda, San Jose, CA (US); Praveen Yalagandula, San Francisco, CA (US); Jeffrey Clifford Mogul, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1003 days.

(21) Appl. No.: 13/285,842

(22) Filed: Oct. 31, 2011

(65) Prior Publication Data

US 2013/0111070 A1    May 2, 2013

(51) Int. Cl.
| G06F 15/16 | (2006.01) |
| H04W 36/00 | (2009.01) |
| G06F 9/46 | (2006.01) |
| H04L 12/24 | (2006.01) |
| H04Q 3/00 | (2006.01) |

(52) U.S. Cl.
CPC .............. *H04L 41/145* (2013.01); *H04L 41/12* (2013.01); *H04Q 3/0083* (2013.01); *Y02B 60/33* (2013.01)

(58) Field of Classification Search
CPC .............. H04L 12/2416; H04L 12/243; H04L 29/08306; H04L 45/22; H04L 41/12; G06F 15/16
USPC .................................. 370/223; 709/224, 250
See application file for complete search history.

(56) References Cited

U.S. PATENT DOCUMENTS

| 6,101,181 | A | * | 8/2000 | Passint et al. .................. 370/352 |
| 6,731,729 | B2 | * | 5/2004 | Eng et al. .................. 379/121.03 |
| 7,633,940 | B1 | | 12/2009 | Singh et al. |
| 7,653,011 | B2 | * | 1/2010 | Rahman et al. ................ 370/256 |
| 8,537,677 | B2 | * | 9/2013 | Ahn et al. ...................... 370/232 |
| 2009/0009215 | A1 | * | 1/2009 | Matsumoto et al. ............ 326/41 |
| 2009/0094436 | A1 | | 4/2009 | Deng et al. |
| 2009/0106529 | A1 | | 4/2009 | Abts et al. |
| 2011/0085561 | A1 | | 4/2011 | Ahn et al. |
| 2012/0020242 | A1 | * | 1/2012 | McLaren et al. .............. 370/254 |
| 2012/0023260 | A1 | * | 1/2012 | Minkenberg .................. 709/238 |
| 2012/0030345 | A1 | * | 2/2012 | Mahadevan et al. .......... 709/224 |
| 2013/0044588 | A1 | * | 2/2013 | Kogge .......................... 370/223 |

FOREIGN PATENT DOCUMENTS

WO        9821857 A1    5/1998

OTHER PUBLICATIONS

Schlansker, Mike, et al., "Ensemble Routing for Datacenter Networks", ANCS'10, Oct. 25-26, 2010, La Jolla, CA, USA.

* cited by examiner

*Primary Examiner* — Arvin Eskandarnia
*Assistant Examiner* — Margishi Desai
(74) *Attorney, Agent, or Firm* — International IP Law Group, PLLC

(57) ABSTRACT

A method of generating a plurality of potential network topologies is provided herein. The method includes receiving parameters that specify a number of servers, a number of switches, and a number of ports in the switches. The parameters are for configuring a network topology. The method also includes generating one or more potential network topologies comprising the set of potential network topologies, for each of a number of dimensions. The number of dimensions is based on the number of switches. The method further includes determining that the set of potential network topologies is structurally feasible. Additionally, the method includes determining an optimal link aggregation (LAG) factor in each dimension of each of the set of potential network topologies.

17 Claims, 5 Drawing Sheets

100

300

GENERATING NETWORK TOPOLOGIES

BACKGROUND

Network topologies are typically tree-based, and do not provide path diversity, or high bandwidth. However, multipath topologies, which are inherently redundant, may provide both. For example, HyperX topologies are an extension of hypercube and flattened butterfly topologies. HyperX topologies provide a large number of paths between any two endpoints, and can provide improvements in bandwidth over typical topologies. However, choosing a cost-effective topology is challenging because the various parameters for configuration create a large design space. The potential network topologies that may be created for a specific set of servers and switches is numerous. Further, these parameters have complex interactions amongst themselves, which makes the design space computationally complex to resolve. Additionally, the physical layout of datacenter racks housing servers in such networks may affect certain settings that influence performance. Generating HyperX topologies in a way that is less computationally complex would be useful in creating multi-path networks with greater bandwidth.

BRIEF DESCRIPTION OF THE DRAWINGS

Certain embodiments are described in the following detailed description and in reference to the drawings, in which.

DETAILED DESCRIPTION

Figure 1:
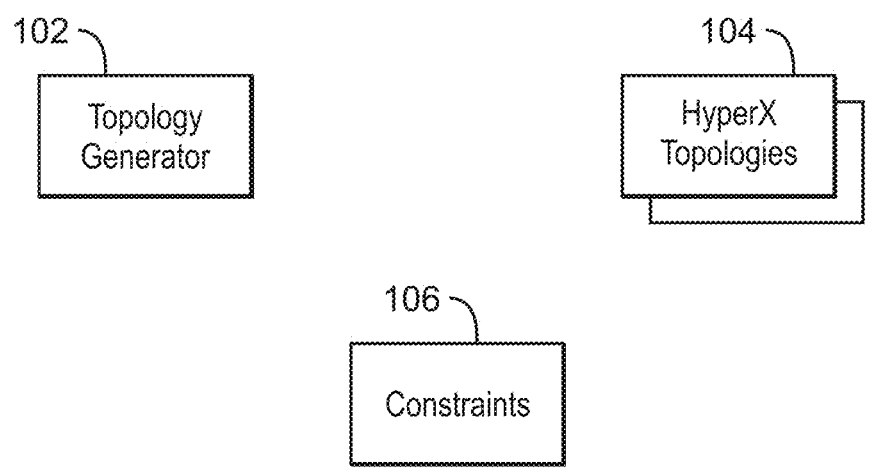
FIG. 1 is a block diagram of a system for generating potential HyperX topologies in accordance with embodiments.

FIG. 1 is a block diagram of a system 100 for generating potential HyperX topologies in accordance with embodiments. The system 100 includes a topology generator 102, HyperX topologies 104, and constraints 106. The topology generator 102 generates a set of HyperX topologies 104 based on a specified set of constraints 106. HyperX topologies 104 are an extension of the hypercube and flattened butterfly topologies. In a HyperX topology 104, switches are points in a D-dimensional integer lattice, with $S_k$ switches in each dimension k=1 ... D. The dimensions may not be equal in size. Each of the switches connects to all other switches that share a dimension. In other words, each switch connects to all switches that share all but one of its coordinates. For example, in a 2 dimensional HyperX topology, a switch connects to all switches in the same row and in the same column. The link bandwidths $K_1, \ldots, K_D$ are fixed in each dimension, but can vary across dimensions. At each switch, T ports are assigned to server downlinks. A network with a HyperX topology may be represented as HyperX(D, ~S, ~K, T), where ~S and ~K are vectors. Further, the number of switches, servers, and links, in the HyperX(D, ~S, ~K, T) may be represented as shown in Formulas 1-3, respectively:

$$\Pi_{k=1}^{D} S_k \quad (1)$$

$$T \cdot \Pi_{k=1}^{D} S_k \quad (2)$$

$$(\tfrac{1}{2}) \cdot \Pi_{k=1}^{D} S_k \cdot \Pi_{k=1}^{D} [(S_k-1) \cdot K_k] \quad (3)$$

The constraints 106 may include space and cost constraints. Other constraints 106 may include achieving a specified bisection bandwidth and using components from a specified list of parts. Parts may include switches with different numbers and types of ports, cables of different types and lengths, etc.

Since the number of topologies feasible even with a set of constraints can be numerous, network designers arbitrarily choose among a few manually-derived topologies. However, this approach can result in an expensive topology. In one embodiment, the topology generator 102 may perform a systematic analysis of the design space, and distribute the available switch ports efficiently across HyperX dimensions. In this way, the topology generator 102 may automatically generate a HyperX topology 104 that fits within a given physical space, achieves a specified bisection bandwidth, reduces the overall cost, and uses components from a specified list of parts. In embodiments, the topology generator 102 is parallelizable and may include large compute clusters. Further, the speed and parallelizability makes it possible to do thorough "what-if" analysis. Such analyses can be useful in making designs future-proof, determining which parts to stock, and reducing costs, such as those associated with maintaining stock keeping units (SKUs).

The topology generator 102 generates all of the potential HyperX topologies 104 based on the constraints 106. In embodiments, a set of potential HyperX topologies 104 is generated based on a given number of servers, N, (or server-equivalents, to account for external bandwidth) and a given number of switches, S, with radix (port count), R. The topology generator 102 ranks the potential HyperX topologies 104 according to their costs. In embodiments, certain simplifying assumptions are made. One example of a simplifying assumption is that all network interface controllers (NICs) and server ports have the same unit bandwidth. Another example of a simplifying assumption is that all switches are similar, and have the same number of servers attached. However, in embodiments, the number of servers attached to each switch may vary.

Figure 2:
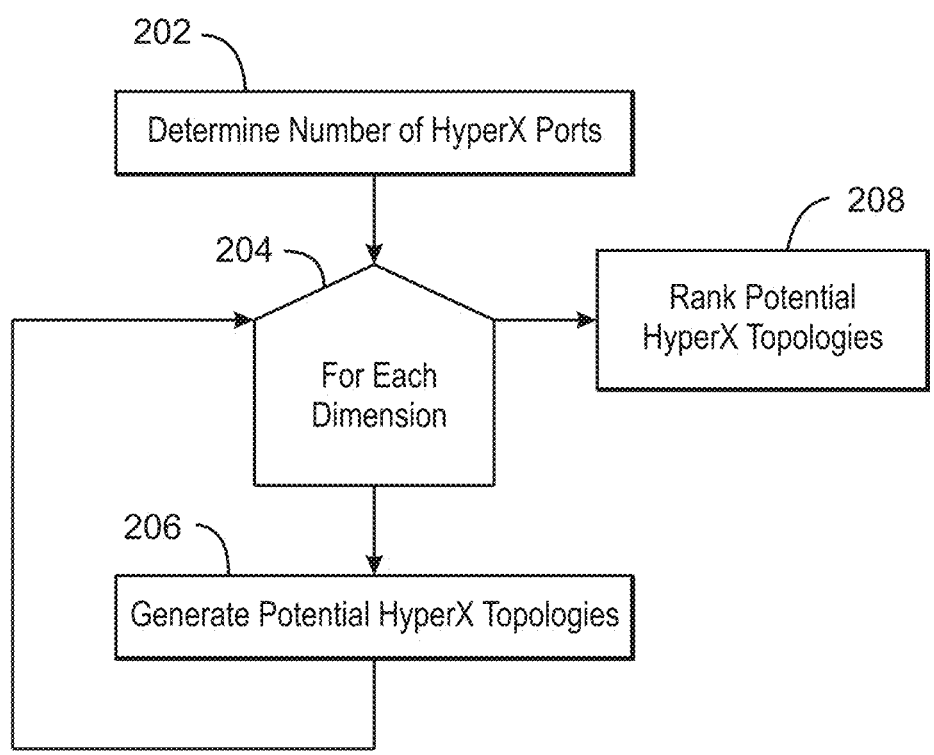
FIG. 2 is a process flow diagram of a method for generating potential HyperX topologies in accordance with embodiments.

FIG. 2 is a process flow diagram of a method 200 for generating potential HyperX topologies 104 in accordance with embodiments. It should be understood that the data flow diagram is not intended to indicate a particular order of execution. The method begins at block 202, where the topology generator 102 determines the number of HyperX ports. The HyperX ports are the ports on each switch that are left available for intra-cluster links. Intra-cluster links are the links between switches. In embodiments where the same number of servers are assigned to each switch, the number of HyperX ports is the difference between the radix and the number of assigned servers.

At block 204, the topology generator 102 iterates over the possible number of dimensions for the potential HyperX topologies 104. This may be based on the number of switches. For example, a potential HyperX topology with eight switches may include up to three possible dimensions (values for D). At block 206, the potential HyperX topologies 104 may be generated. In other words, all possible values of ~S may be generated for each number of dimensions, D. For a single dimension (D=1), the potential HyperX topologies 104 are limited to one linear topology ($S_1$=S). A method for generating potential HyperX topologies 104 in multiple dimensions is described with reference to FIG. 3. At block 208, the potential HyperX topologies 104 are ranked according to cost. A user may select from the potential HyperX topologies 104 for implementation.

Figure 3:
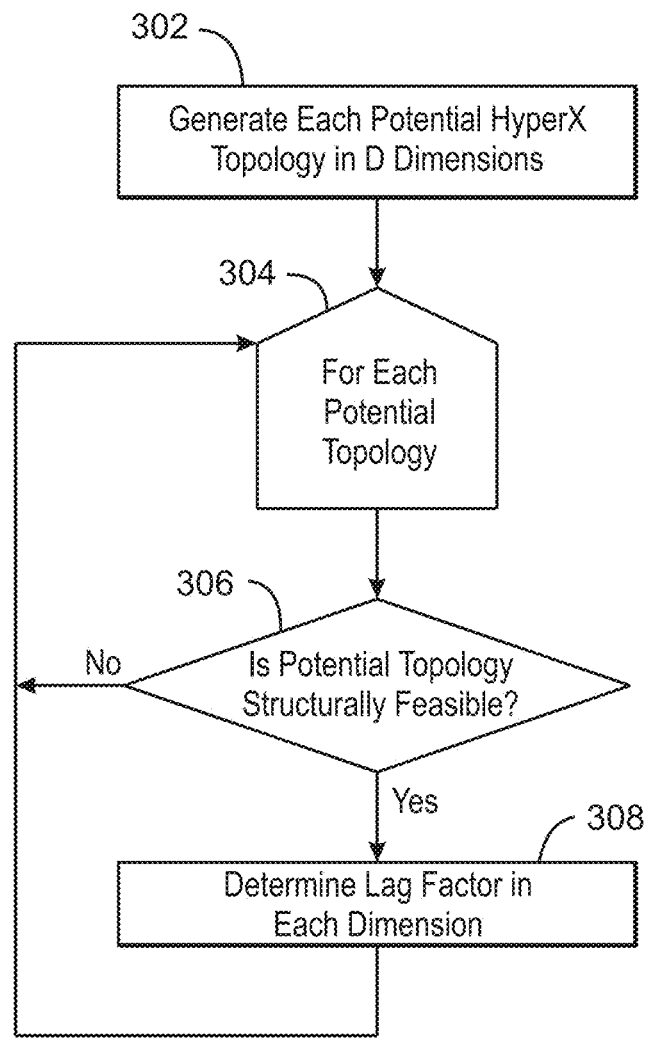
FIG. 3 is a process flow diagram of a method for generating potential HyperX topologies, in accordance with embodiments.

FIG. 3 is a process flow diagram of a method 300 for generating potential HyperX topologies 104 in accordance with embodiments. It should be understood that the data flow diagram is not intended to indicate a particular order of execution. Furthermore, the method 300 may be performed at block 206 of FIG. 2. The method begins at block 302, where the topology generator 102 may generate each potential HyperX topology 104 in a specific number of dimensions, D. In embodiments, the topology generator 102 takes each potential HyperX topology 104 from D−1 dimensions, and splits one of the dimensions. For example, a two dimensional topology, e.g., a 6×6 topology can be split into a three dimensional, 6×3×2 topology. Similarly, the 6×3×2 topology may be split into a 3×3×2×2 topology.

Blocks 304-308 are repeated for each potential Hyperx topology 104 generated at block 302. At block 306, the topology generator 102 may determine whether the potential topology 104 is structurally feasible. A potential HyperX topology 104 is not structurally feasible if there are not enough HyperX ports to connect to all the remaining switches in each dimension. If the potential HyperX topology 104 is not feasible, this potential HyperX topology is discarded and the method 300 iterates to the next potential HyperX topology 104. In one embodiment, structurally infeasible topologies may include potential HyperX topologies 104 that use too many connectors to fit on a switch faceplate.

It is noted that when generating potential HyperX topologies 104 by splitting from the topologies from the D−1 dimension, all of the previous candidates generated for D−1 dimension are considered, even the structurally infeasible ones. This is due to the fact that the progeny of an infeasible topology may be structurally feasible.

If the potential HyperX topology 104 is structurally feasible, at block 308, the LAG factor is determined in each dimension. In other words, the topology generator 102 generates the vector, ~K. In embodiments, the LAG factors are multiples of the connector and cable width.

Bisection bandwidth represents the available bandwidth over all bisections of a network. The bisection bandwidth of a HyperX(D, ~S, ~K, T) depends both on the topology dimensions, ~S, and the LAG factors, ~K. By optimizing ~K, bisection bandwidth may be improved. Optimizing ~K is the same as finding an optimal distribution of each switch's available ports (hyperx ports) among the different dimensions, such that the bisection bandwidth is maximized. In embodiments, given: (i) switches with radix R, of which T ports are used for links to servers and (ii) a HyperX network with D dimensions, with sizes ~S=($S_1$, $S_2$, ..., $S_D$), the remaining R−T ports of each switch among the D dimensions are distributed such that the bisection bandwidth of the topology is maximized. It is noted that for HyperX(D, ~S, ~K, T), the bisection bandwidth may be represented as shown in Equation 4:

$$\min_{i=1}^{D} S_i K_i \quad (4)$$

The LAG factors may be maximized under the constraints shown in Equations 5-6:

$$\forall i, K_i \in \mathbb{Z} \quad (5)$$

$$\Sigma_{i=1}^{D}(S_i-1)K_i \leq R-T \quad (6)$$

Every dimension, i, with the minimal $S_i K_i$ product is considered for expanding the LAG factor. If enough spare ports are available to increase the bandwidth in that dimension, then the LAG factor is incremented by 1. This process is repeated until there are not enough spare ports left to increase the bisection bandwidth.

In the description above, a set of potential HyperX topologies 104 is generated that include a specified number of switches, S. However, in some cases, the value of S may not be divisible among multiple dimensions. For example, when S is prime, only a single dimension topology is possible, which may be inefficient. In one embodiment, the topology generator 102 may add switches to the specified number to enable more efficient potential HyperX topologies 104. For example, suppose a user specifies a 31-switch network. Since 31 is prime, this forces a single linear design (effectively, a full mesh). However, adding one switch allows a much wider variety of candidates (e.g., 8×4 or 4×4×2), which could make the design feasible with fewer switch ports. Even if the specified number of switches is not prime, the number might have inconvenient factors, that would be difficult to satisfy unless the number of ports per switch is quite large. For example, if the specified number is 94, the potential HyperX topologies 104 would include switches with at least 49 ports, plus the number of servers, T, per switch. However, potential HyperX topologies 104 with 95 switches are structurally feasible with only 24+T-port switches.

Figure 4:
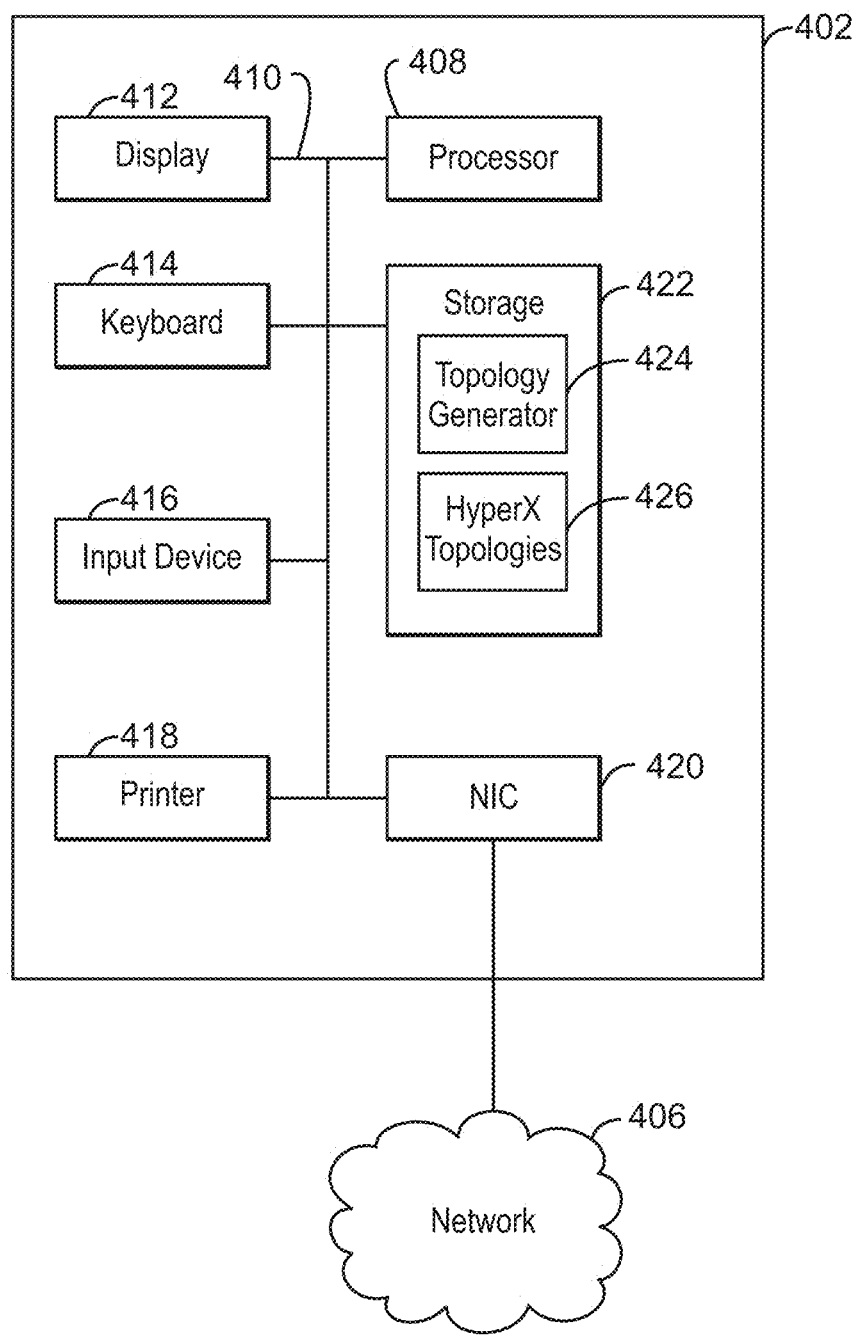
FIG. 4 is a block diagram of a system for generating potential HyperX topologies in accordance with embodiments.

FIG. 4 is a block diagram of a system 400 for generating HyperX topologies in accordance with embodiments. The functional blocks and devices shown in FIG. 4 may comprise hardware elements, software elements, or some combination of software and hardware. The hardware elements may include circuitry. The software elements may include computer code stored on a non-transitory, computer-readable medium. Additionally, the functional blocks and devices of the system 400 are but one example of functional blocks and devices that may be implemented in embodiments. Specific functional blocks may be defined based on design considerations for a particular electronic device.

The system 400 may include servers 402 in communication with a network 406. Each of the servers 402 may include a processor 408, which may be connected through a bus 410 to a display 412, a keyboard 414, an input device 416, and an output device, such as a printer 418. The input devices 416 may include devices such as a mouse or touch screen. The servers 402 may also be connected through the bus 410 to a network interface card 420. The network interface card 420 may connect the servers 402 to the network 406. The network 406 may be a local area network, a wide area network, such as the Internet, or another network configuration. The network 406 may include routers, switches, modems, or any other kind of interface device used for interconnection. In one example embodiment, the network 406 may be the Internet.

The servers 402 may operate in parallel compute clusters, or individually. The servers 402 may also have other units operatively coupled to the processor 412 through the bus 410. These units may include non-transitory, computer-readable storage media, such as storage 422. The storage 422 may include media for the long-term storage of operating software and data, such as hard drives. The storage 422 may also include other types of non-transitory, computer-readable media, such as read-only memory and random access memory.

The storage 422 may include the machine readable instructions used in embodiments of the present techniques. In embodiments, the storage 422 may include a topology generator 424 and HyperX topologies 426. The topology generator 424 may generate all structurally feasible HyperX topologies with various dimensions, and rank them according to cost.

Figure 5:
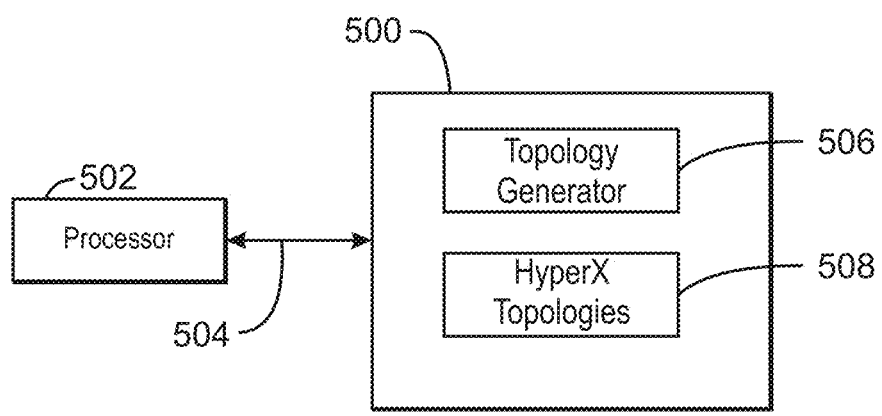
FIG. 5 is a block diagram showing a non-transitory, computer-readable medium that stores code for generating potential HyperX topologies in accordance with embodiments.

FIG. 5 is a block diagram showing a non-transitory, computer-readable medium that stores code for generating potential HyperX topologies in accordance with embodiments. The non-transitory, computer-readable medium is generally referred to by the reference number 500.

The non-transitory, computer-readable medium 500 may correspond to any typical storage device that stores computer-implemented instructions, such as programming code or the like. For example, the storage device may include a hard disk drive, a magnetic disk drive, e.g., to read from or write to a removable magnetic disk, or an optical disk drive, e.g., for reading a CD-ROM disk or to read from or write to other optical media. Further, other types of media that are readable by a computer system and that are suitable to the desired end purpose may be used, such as magnetic cassettes, flash memory cards, digital video disks, Bernoulli cartridges, and the like.

The storage device may be connected to a system bus by a storage device interface, such as a hard disk drive interface, a magnetic disk drive interface, or an optical drive interface. For example, the storage device may be the storage 422 discussed with respect to FIG. 4.

When read and executed by a processor 502 via a communication path 504, the instructions stored on the non-transitory, computer-readable medium 500 are adapted to cause the processor 502 to generate a set of potential HyperX topologies according to an example embodiment, as described herein. The non-transitory, computer-readable medium 500 may include a topology generator 506, and HyperX topologies 508. The topology generator 506 may generate HyperX topologies 508 for a specific number of switches and servers in numerous dimensions using an optimal amount of available bandwidth.

What is claimed is:

1. A method of generating a set of potential network topologies, comprising:
    receiving parameters that specify a number of servers, a number of switches, and a number of ports in the switches, for configuring a network topology; and
    generating one or more potential network topologies comprising the set of potential network topologies, for each of a number of dimensions, wherein the number of dimensions is based on the number of switches;
    determining that the set of potential network topologies is structurally feasible; and
    determining an optimal link aggregation (LAG) factor in each dimension of each of the set of potential network topologies, wherein the potential network topologies comprise potential HyperX topologies, wherein determining that the set of potential network topologies is structurally feasible comprises determining that $R-T \geq \Sigma_{i=1}^{D}(S_i-1)K_i$,
    wherein R represents a number of ports assigned to a switch, T represents a number of servers assigned to the switch, D represents a number of dimensions in a network topology, $S_i$ represents a number of switches in a dimension, and $K_i$ represents a link aggregation factor of the switch.

2. The method recited in claim a 1, wherein a HyperX topology comprises a network configuration wherein each switch is connected to all other switches in each dimension that the switch belongs to.

3. The method recited in claim 1, comprising ranking the set of potential HyperX topologies based on a cost for each of the set of potential HyperX topologies.

4. The method recited in claim 1, wherein determining the optimal LAG factor comprises increasing a number of ports assigned from each switch to all other switches in a dimension that improves bisection bandwidth.

5. The method recited in claim 4, wherein the number of ports comprises an integer comprising a number of available ports on the switch assigned to connect to the other switches in the dimension.

6. The method recited in claim 1, wherein generating the one or more potential network topologies comprises:
    generating first plurality of potential network topologies for a first number of dimensions; and
    generating a second plurality of potential network topologies for a second number of dimensions by splitting one of the first number of dimensions into two dimensions.

7. The method recited in claim 1, wherein generating the one or more potential network topologies is based on one or more constraints of each potential network topology comprising:
    a specified cost;
    a specified bisection bandwidth;
    a space constraint; and
    using components from a specified list of parts.

8. The method recited in claim 7, wherein the specified list of parts comprise:
    switches with different numbers and types of ports;
    cables of different types; and
    cables of different lengths.

9. A computer system for generating a set of potential HyperX topologies, comprising:
    a memory storing instructions;
    a processor configured to execute the instructions to:
    receive parameters that specify a number of servers, a number of switches, and a number of ports in the switches, for configuring a HyperX topology; and
    generate one or more potential HyperX topologies comprising the set of potential HyperX topologies, for each of a number of dimensions, wherein the number of dimensions is based on the number of switches;
    determine that the set of potential HyperX topologies is structurally feasible; and
    determine an optimal link aggregation (LAG) factor in each dimension of each of the set of potential HyperX topologies, wherein determining that the set of potential HyperX topologies is structurally feasible comprises determining $R-T \geq \Sigma_{i=1}^{D}(S_i-1)K_i$,
    wherein R represents a number of ports assigned to a switch, T represents a number of servers assigned to the switch, D represents a number of dimensions in a network topology, $S_i$ represents a number of switches in a dimension, and $K_i$ represents a link aggregation factor of the switch.

10. The computer system recited in claim 9, wherein the processor is configured to execute the instructions to rank the set of potential HyperX topologies based on a cost for each of the set of potential HyperX topologies.

11. The computer system recited in claim 9, wherein the optimal LAG factor is determined by increasing a number of ports assigned from each switch to all other switches in the dimension.

12. The computer system recited in claim 9, wherein the number of ports comprises an integer comprising a number of available ports on the switch assigned to connect to the other switches in the dimension.

13. The computer system recited in claim 9, wherein a HyperX topology comprises a network configuration wherein each switch is connected to all other switches in each dimension to which the switch belongs.

14. The computer system recited in claim 9, wherein the one or more potential HyperX topologies is generated based on one or more constraints of each potential network topology comprising:
  a specified cost;
  a specified bisection bandwidth;
  a space constraints; and
  using components from a specified list of parts.

15. The computer system recited in claim 9, wherein the one or more potential HyperX topologies is generated by:
  generating a first plurality of potential network topologies for a first number of dimensions; and
  generating a second plurality of potential network topologies for a second number of dimensions by splitting one of the first number of dimensions into two dimensions.

16. A non-transitory, computer-readable medium comprising machine-readable instructions executable by a processor to:
  receive parameters that specify a number of servers, a number of switches, and a number of ports in the switches, for configuring a HyperX topology; and
  generate one or more potential HyperX topologies comprising the set of potential HyperX topologies, for each of a number of dimensions, wherein the number of dimensions is based on the number of switches, wherein determining that the set of potential network topologies is structurally feasible comprises determining that $R-T \geq \sum_{i=1}^{D}(S_i-1)K_i$, wherein R represents a number of ports assigned to a switch, T represents a number of servers assigned to the switch, D represents a number of dimensions in a network topology, $S_i$ represents a number of switches in a dimension, and Ki represents a link aggregation factor of the switch;
  determine that the set of potential HyperX topologies is structurally feasible;
  determine an optimal link aggregation (LAG) factor in each dimension of each of the set of potential HyperX topologies;
  generate a first plurality of potential network topologies for a first number of dimensions; and
  generate a second plurality of potential network topologies for a second number of dimensions by splitting one of the first number of dimensions into two dimensions.

17. The non-transitory, computer-readable medium recited in claim 16, wherein the optimal LAG factor is determined by increasing a number of ports assigned from each switch to all other switches in the dimension.

* * * * *

UNITED STATES PATENT AND TRADEMARK OFFICE
CERTIFICATE OF CORRECTION

PATENT NO. : 9,148,348 B2  
APPLICATION NO. : 13/285842  
DATED : September 29, 2015  
INVENTOR(S) : Jayaram Mudigonda et al.

Page 1 of 1

It is certified that error appears in the above-identified patent and that said Letters Patent is hereby corrected as shown below:

In the Claims  
In column 5, line 59, in Claim 2, delete "claim a 1," and insert -- claim 1, --, therefor.

Signed and Sealed this  
Twenty-first Day of June, 2016

Michelle K. Lee  
*Director of the United States Patent and Trademark Office*